United States Patent
Jollota

(12) 
(10) Patent No.: US 6,295,339 B1
(45) Date of Patent: Sep. 25, 2001

(54) AUDIO VERIFICATION OF DIGITAL SUBSCRIBER LINE CONNECTION

(75) Inventor: James M. Jollota, Simi Valley, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/507,073

(22) Filed: Feb. 18, 2000

(51) Int. Cl.[7] .................................................... H04M 1/24
(52) U.S. Cl. ........................ 379/22.04; 379/12; 379/16; 379/21; 379/32.02; 270/248
(58) Field of Search .................................. 379/1, 10, 12, 379/14, 16, 18, 22, 23, 31, 32, 34, 9, 27, 29; 370/241, 247, 248, 250, 251

(56) References Cited

U.S. PATENT DOCUMENTS

| | | | |
|---|---|---|---|
| 5,166,925 | * | 11/1992 | Ward ........................................ 370/55 |
| 6,002,746 | * | 12/1999 | Mulcahy et al. ........................ 379/22 |

* cited by examiner

*Primary Examiner*—Binh Tieu
(74) *Attorney, Agent, or Firm*—Allen, Dyer, Doppelt, Milbrath & Gilchrist, P.A.

(57) ABSTRACT

A test matrix switch-associated mechanism conducts an interactive communication session with the butt set of an incumbent local exchange carrier (ILEC) technician, to verify the intended connectivity of a digital subscriber line pair through the switch to customer premises equipment subscribing to digital service from a competitive local exchange carrier (CLEC). Connectivity through the switch is controlled by way of a supervisory control processor that may be downloaded with communication and test control software from a remote test unit, in association with one or more CLECs that are served by the ILEC's central office equipment. Once loaded with this control software, including a routine for executing the connectivity verification mechanism of the invention, the switch's control processor sources digitally synthesized test signals for application to a line under test, and conducts a digitally-based analysis of replies to such signals as supplied by a craftsperson's butt set. The executed routine enables an ILEC technician to remotely verify and complete establishment of a digital subscriber line path through the switch for the digital service supplied by the CLEC.

18 Claims, 1 Drawing Sheet

AUDIO VERIFICATION OF DIGITAL SUBSCRIBER LINE CONNECTION

FIELD OF THE INVENTION

The present invention is directed to communication systems, and is particularly directed to a programmable test matrix switch-associated mechanism, that is operative to conduct an interactive wireline connection verification session with a craftsperson's butt set, to confirm the intended connectivity of a digital subscriber line pair through the matrix switch to customer premises equipment.

BACKGROUND OF THE INVENTION

In the face of the increasing demand for a variety of high speed digital data communication services (such as, but not limited to HDSL, ADSL and SDSL), telecommunication service providers are continually seeking ways to optimize utilization of their very substantial existing copper plant, that was originally installed for the purpose of carrying nothing more than conventional analog (plain old telephone service or POTS) signals. When providing a high speed digital line service to a subscriber site in response to a request by a competitive local exchange carrier (CLEC), such as an internet service provider (ISP), the incumbent local exchange carrier (ILEC), such as a Bell operating company (RBOC), will customarily dispatch a technician to a remote site serving the customer premises equipment.

At the remote location, such as a curbside junction box serving the customer premises, the ILEC technician will make a physical connection for the wireline pair, through which digital data service supplied by the CLEC is to be provided to the customer's data terminal equipment, in accordance with an installation ticket derived from an archival database kept by the telco. At that point, as far as the ILEC is concerned, the job is done, since the installer is unable to verify the connection.

This inability to verify the connection is due to the fact that, unlike a conventional POTS line, which is connected legacy analog equipment at the central office, and therefore provides dial tone that enables the craftsperson to make a call back to the central office (CO) and verify that the connection is correct, the digital wireline is not so terminated, making it a 'silent' line. This silent condition of the digital line, coupled with the fact that the accuracy of the telco's records associated with any particular wireline pair are uncertain, frequently results in 'no service' complaints from the customer and the need for follow up investigation by ILEC and/or CLEC service personnel.

SUMMARY OF THE INVENTION

In accordance with the present invention, the above-described digital line connection verification problem is effectively obviated by means of an interactive, synthesized audio message-based mechanism, that may be installed within the supervisory control processor of a test access matrix switch, such as a CTAS matrix switch, installed in a central office, or as part of test signal generation and processing circuitry of a portable craftsperson's test set that is connectable to the matrix switch. In the non-limiting example to be detailed below, the invention resides in the test matrix switch's control processor. Cross-points of the matrix switch selectively connect high data rate digital data traffic channels supplied by a digital subscriber loop access multiplexer (DSL AM) with selected wireline twisted pairs, that are coupled via a multidistribution frame to subscriber 'drops', which typically extend a substantial distance out to (remote) customer premises equipment sites.

Connectivity through the interconnect matrix switch is controlled by way of a supervisory control processor that may be downloaded with communication and test control software from the test head in association with one or more CLECs that are served by the ILEC's central office equipment. Once loaded with this control software, including a routine for executing the connectivity verification mechanism of the invention, the matrix switch is operative to source digitally synthesized test signals for application to a line under test, and to conduct a digitally-based analysis of replies to such signals as supplied by a craftsperson's butt set, during an interactive line connectivity verification session, that is initiated once the ILEC craftsperson, who has been dispatched to the remote site serving the customer premises equipment, has completed the physical connection between the subscriber's line and the wireline pair of interest.

Pursuant to this verification routine, the ILEC technician performs a high impedance connection between his butt and the line, so that he is able to monitor the line without creating an 'off-hook' current flow condition that would be detectable by off-hook sensing circuitry at the central office matrix switch. In this high impedance bridge state, the technician unobtrusively listens to the line for a prescribed CLEC identification audio signal, that is repeatedly synthesized by the control processor of the matrix switch and supplied to cross-points associated with all unterminated lines for the CLEC of interest.

If the ILEC technician fails to hear the expected CLEC message, it is inferred that there is a physical wireline connectivity problem somewhere in the path back to the switch, including the possibility that the ILEC technician was told to connect the wrong wireline pair, or one or more potential cross-connect anomalies between the remote access location and the switch. As such a problem is associated with the ILEC's cable plant, and/or cable plant records, a separate ILEC troubleshooting operation, including intervention by the same or other ILEC service personnel is conducted.

With either no problem or a solution to the physical connectivity problem the ILEC technician will hear the CLEC's ID message, informing him that he has successfully provided a CLEC wireline path for the customer premises site back to the matrix switch. The next operation is to change the cross-connect at the matrix switch from the line verification test path to the subscription high speed path from the DSL AM.

For this purpose, the craftsperson places his butt set in an off-hook condition. In response to sensing the line going off-hook, the (CTAS) matrix switch's control processor synthesizes a prescribed user prompt message (such as "Speak or enter Password") over the wireline path to the ILEC craftsperson's butt set. Upon hearing this prompt, the ILEC technician enters a password at his butt set. In response to detecting entry of this password, the the matrix switch's cross-connect is changed from the line test path to the DSL AM, thus changing the wireline path to the high speed DSL service provided by the CLEC, through the DSL AM and the digital wireline path that has been physically remotely completed by the technician at the remote site serving the CPE equipment.

DETAILED DESCRIPTION

Figure 1:
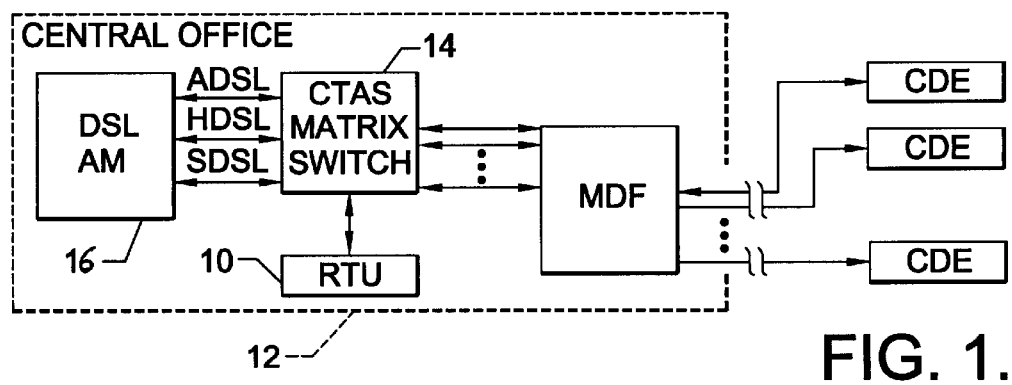
FIG. 1 is a reduced complexity network diagram showing a plurality of wireline pairs that extend from a central office to locations serving customer premises-installed digital communication equipment.

Before detailing the automated interactive, synthesized audio message-based, digital wireline connection verification mechanism of the invention, it should be observed that the present invention resides primarily in an arrangement of conventional communication hardware components and attendant supervisory microprocessor circuitry and application software therefor, that controls the operations of such components and analysis of signals interfaced therewith. In a practical implementation that facilitates their incorporation into telecommunication link test equipment (such as that which may be installed at a central office or resident in a craftsperson's test device), the inventive arrangement may be readily implemented using a general purpose digital computer, or field programmable gate array (FPGA)-configured, application specific integrated circuit (ASIC) chip sets. In terms of a practical hardware implementation of such chip sets, digital ASICs are preferred.

Consequently, the configuration of such components and the manner in which they may be interfaced with a (copper) wireline communication link have, for the most part, been shown in the drawings by readily understandable block diagram and flow chart illustrations, which show only those specific details that are pertinent to the present invention, so as not to obscure the disclosure with details which will be readily apparent to those skilled in the art having the benefit of the description herein. Thus, the Figures are primarily intended to show the major components and functional modules of the system of the invention in convenient functional groupings, whereby the present invention may be more readily understood.

Attention is now directed to FIG. 1, wherein a reduced complexity embodiment of the digital wireline connection verification mechanism of the present invention is diagrammatically shown as comprising a processor-controlled test head 10, such as may be installed in a central office 12, or as part of test signal generation and processing circuitry of a portable craftsperson's test set. The test head 10 may comprise any of a variety of commercially available test units employed in the industry used to conduct wideband electrical measurements on a selected line under test. As non-limiting examples, the test head 10 may comprise a Turnstone CX-100 test unit, or a Harris Wideband Test Pack (WTP).

The test head 10 is connected to a test access matrix switch 14, such as a CTAS interconnect matrix switch, which contains a plurality of programmable (test-accessible) cross-points that are controllably operative to interconnect one or more high data rate digital data traffic channels (e.g., ADSL, HDSL and SDSL channels) supplied by a digital subscriber loop access multiplexer (DSL AM) 16 with selected wireline pairs 18 serving customer premises equipment at various remote sites. In a typical central office installation, some number of the wireline connection points of the (CTAS) matrix switch will be coupled via links 19 through a multidistribution frame (MDF) 21 to digital subscriber loop 'drops' 23, which extend out to various customer premises equipment (CPE) sites 25.

Connectivity through the (CTAS) interconnect matrix switch 14 is controlled by way of a programmable control processor 15 that may be downloaded with communication and test control software from the test head 10 in association with one or more CLECs served by the ILEC's central office equipment. Once loaded with this control software, including a routine for executing the connectivity verification mechanism of the invention to be described, the CTAS matrix switch 14 is operative to source digitally synthesized test signals (including tone signals and digitized speech) for application to a line under test, and to conduct a digitally-based analysis of replies to such signals as supplied by a craftsperson's butt set, during an interactive line connectivity verification session, to be detailed below with reference to the flow chart of FIG. 2.

Figure 2:
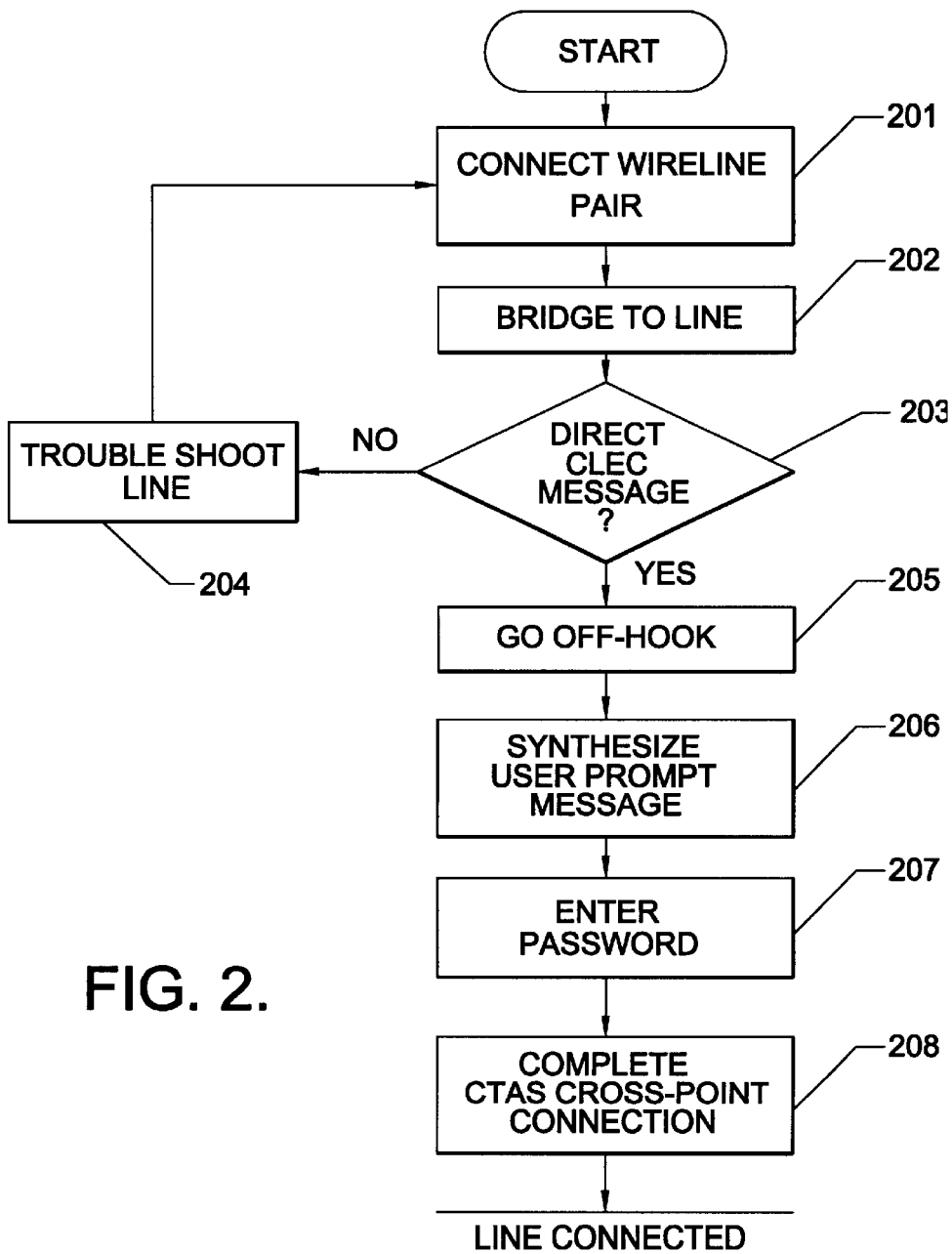
FIG. 2 is a flow chart showing the steps of the automated noise extrapolation mechanism of the present invention.

The overall functional sequence of the interactive wireline connection verification mechanism of the present invention is shown in the flow diagram of FIG. 2. At an initial step 201, a ILEC craftsperson who has been dispatched to the remote site (e.g., curbside junction box) serving the customer premises equipment will make a physical connection between the subscriber's line and the wireline pair specified on the service ticket, and then effect a high impedance ('no load') bridge onto that connection using his butt set. Because the high impedance connection of a standard butt set does not draw significant current, the ILEC technician is able to monitor the line without creating an 'off-hook' current flow condition that would be detectable by off-hook sensing circuitry at the central office matrix switch.

Next, in this high impedance bridge state (step 202), the technician listens to the line for the presence of a prescribed identification signal. As pointed out above, the control processor of the CTAS matrix switch repeatedly supplies all unterminated lines with a prescribed information audio signal, such as a synthesized voice message, identifying the CLEC leasing the line of interest. Namely, until a verified connection has been provided to the subscriber site, the cross-point of the test matrix switch associated with a wireline path to that site is coupled to receive the CLEC identification message from the switch's control processor, while being decoupled from a communication path to the DSL AM 16, through which digital communication services are supplied by the CLEC. As a consequence, if there is a continuous wireline path back to the matrix switch from the point of connection, in query step 203, the ILEC technician should hear a CLEC-identification (ID) message, such as a one containing the name of the CLEC—for example: "XYZ digicom services."

However, if the craftsperson fails to hear the expected message, including nothing—the line remaining silent, so that the answer to query step 203 is NO, it is inferred that there is a physical wireline connectivity problem somewhere in the path back to the switch, including the possibility that the ILEC technician was given the wrong junction box connection, or one or more potential cross-connect anomalies between the remote access location and the switch. Since this is a problem associated with the ILEC's cable plant, and/or cable plant records, a separate ILEC troubleshooting operation, including intervention by the same or other ILEC service personnel is conducted in step 204, to resolve the problem.

Once the physical connectivity problem has been solved by the ILEC, or if no problem exists, the craftsperson will hear the CLEC ID message (the answer to query step 203 becomes YES), informing the technician that he has successfully provided a CLEC wireline path for the customer premises site to the switch. The next operation is to change the cross-connect at the switch from the line test path to the high speed path from the DSL AM 16. For this purpose, the routine next transitions to step 205, wherein the craftsperson places his butt set in an off-hook condition.

In response to sensing the line of interest going off-hook, in step 206, the CTAS switch's control processor accesses a prescribed user prompt message (such as "Speak or enter Password," as a non-limiting example) from memory and synthesizes this message over the line to the ILEC craftsperson's butt set. Upon hearing this prompt, in step 207, the ILEC technician provides (via key entry or voice) a prescribed password (e.g., a predefined number sequence, such as "1-2-3") at his butt set. In response to this password, in step 208, the CTAS changes the matrix switch's cross-connect from the line test path to the DSL AM 16, thereby completing the wireline path for the subscriber to high speed DSL service provided by the CLEC, through the DSL AM and the wireline path that has been physically remotely completed by the technician at the connection site for the subscriber's CPE equipment.

As will be appreciated from the foregoing description, the interactive, synthesized audio message-based mechanism of the present invention successfully remedies the inability an ILEC technician to verify the installation of a wireline path for CLEC digital service to a remote customer premises. Advantageously, the invention may be readily programmed (e.g., downloaded from a remote test unit) into the supervisory control processor of a (CTAS) test access matrix switch installed in a central office. Once loaded with this routine, the CTAS matrix switch's control processor is operative to source digitally synthesized test signals for application to a line under test, and to conduct a digitally-based analysis of replies to signals supplied by the craftsperson, during an interactive line connectivity verification session.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. A method of providing a digital subscriber line path between a source of digital communication services supplied by a competitive local exchange carrier (CLEC) to an incumbent local exchange carrier (ILEC) site and a customer premises site, said method comprising the steps of:
   (a) providing a wireline path, that is connectable to said source of digital communication services, between said ILEC site and said customer premises site;
   (b) coupling a test set to a remote location of said wireline path associated with said customer premises site; and
   (c) conducting an interactive communication session between said test set and said ILEC site that is effective to enable said test set to remotely verify that said wireline path is connectable to said source of digital communication services, and to place said wireline path in circuit with each of said source of digital communication services and said customer premises site, said interactive communication session including the step of changing a cross-connect of a matrix switch from a line test path to a high speed telecommunication service provided by the CLEC based on a prescribed user prompt message and user reply.

2. A method according to claim 1, wherein
   step (a) includes, at said ILEC site, coupling a CLEC identification signal associated with said CLEC to said wireline path,
   step (b) includes, at said remote location, monitoring said wireline path for said CLEC identification signal, and
   step (c) includes conducting said interactive communication session in response to detecting said CLEC identification signal.

3. A method according to claim 1, wherein step (c) comprises the steps of:
   (c1) in response to detecting said CLEC identification signal, causing said test set to place a prescribed electrical condition on said wireline path,
   (c2) at said ILEC site, in response to detecting said prescribed electrical condition on said wireline path, transmitting a user prompt message to said test set, and
   (c3) in response to detecting said user prompt message, transmitting from said test set a message that is effective to place said wireline path in circuit with said source of digital communication services and said customer premises site.

4. A method according to claim 2, wherein said ILEC site includes a test matrix switch through which said wireline path is controllably connectable to said source of digital communication services, and wherein step (a) comprises causing said test matrix switch to couple said CLEC identification signal to said wireline path, while decoupling said wireline path from said source of digital communication services.

5. A method according to claim 2, wherein (a) comprises unobtrusively coupling an ILEC technician's test set to said to a remote location of said wireline path, step (b) includes, at said remote location, listening for a prescribed audio message associated with said CLEC, and step (c) comprises placing said ILEC technician's test set in an off-hook condition, in response to detecting said prescribed audio message associated with said CLEC.

6. A method according to claim 2, wherein said CLEC identification signal comprises a synthesized voice message that enables said technician to identify said CLEC.

7. A method according to claim 2, wherein step (c) further comprises, in response to failing to detect said CLEC identification signal, performing one or more remedial steps, as necessary, to provide a wireline path for digital communication services supplied by said CLEC for delivery to said customer premises equipment.

8. A method for enabling an incumbent local exchange carrier (ILEC) technician to remotely verify establishment of a digital subscriber line path to a wireline connection for a customer premises site for digital communication services supplied by a competitive local exchange carrier (CLEC) to a matrix switch at an ILEC site, said matrix switch having a plurality of cross-points, through which digital subscriber line paths for digital communication services supplied said CLEC are controllably connectable over wireline paths to remote sites at which wireline connections to customer premises equipment are effected, and a control processor coupled with cross-points and being operative to control connectivity therethrough, said method comprising the steps of:
   (a) coupling a test set with said wireline connection; and
   (b) conducting an interactive communication session between said test set and said control processor that is effective to enable said technician to remotely verify that a digital subscriber line path exists between said wireline connection and a cross-point of said matrix switch associated with digital communication services supplied by said CLEC, and to cause said control processor to couple said cross-point to a communication path through which digital communication services are supplied by said CLEC, said interactive communication session including the step of changing a cross-connect of a matrix switch from a line test path to a high speed telecommunication service provided by the CLEC based on a prescribed user prompt message and user reply.

9. A method according to claim 8, wherein step (b) includes the steps of:

(b1) causing said test set to monitor said wireline connection for the presence of a prescribed identification signal generated by said control processor and associated with said CLEC;

(b2) in response to step (b1) detecting said prescribed identification signal associated with said CLEC, causing said test set to exhibit a prescribed electrical condition that is detectable by said control processor;

(b3) in response to detecting said prescribed electrical condition, causing said control processor to transmit a user prompt message therefrom to said test set; and (b4) in response to detecting said user prompt message, transmitting from said test set a message that is effective to cause said control processor to operate said cross-point of said matrix switch to complete establishment of said digital subscriber line path between said CLEC and said customer premises equipment.

10. A method according to claim 9, wherein step (b1) comprises coupling said prescribed identification signal associated with said CLEC to said cross-point of said test matrix switch associated with a wireline path to said wireline connection, while decoupling said cross-point from a communication path through which digital communication services are supplied by said CLEC, and step (b4) comprises, in response to detecting said message that is effective to complete establishment of said digital subscriber line path between said CLEC and said customer premises equipment, coupling said cross-point to a communication path through which digital communication services are supplied by said CLEC, and decoupling said cross-point from a path through which said prescribed identification signal associated with said CLEC is provided.

11. A method according to claim 9, wherein step (a) comprises unobtrusively coupling an ILEC technician's butt set to said wireline connection, step (b1) comprises listening for a prescribed audio message associated with said CLEC, and step (b2) comprises placing said ILEC technician's butt set in an off-hook condition, in response to detecting said prescribed audio message associated with said CLEC.

12. A method according to claim 9, wherein said prescribed identification signal associated with said CLEC comprises a synthesized voice message that enables said technician to identify said CLEC.

13. A method according to claim 9, wherein step (b2) further comprises, in response to failing to detect said prescribed identification signal associated with said CLEC, performing one or more remedial steps, as necessary, to provide a wireline path for digital communication services supplied by said CLEC for delivery to said customer premises equipment.

14. For use with a test matrix switch installed an incumbent local exchange carrier (ILEC) site and having a plurality of cross-points, through which digital subscriber line paths for digital communication services supplied by one or more competitive local exchange carriers (CLECs) to said ILEC site are controllably connected over wireline paths therefrom to customer premises sites, a system comprising:

a control processor coupled with said test matrix switch, and being operative to communicate, by way of a cross-point of said test matrix switch associated with a wireline path to a wireline connection for customer premises equipment at a remote site, with a test set coupled to said wireline connection, while decoupling said cross-point from a communication path through which digital communication services are supplied by a CLEC; and a test set through which a technician may be placed in communication with said wireline connection, and being operative to exchange signals with said control processor, that enable said technician to remotely verify establishment of a digital subscriber line path through said cross-point for digital communication services supplied by said CLEC by changing a cross-connect of the matrix switch from a line test path to a high speed telecommunications service provided by the CLEC based on a prescribed user prompt message and user reply.

15. A system according to claim 14, wherein said test set is operative to monitor said wireline connection for a prescribed identification signal generated by said control processor associated with said CLEC and, in response to detecting said prescribed identification signal associated with said CLEC, to acquire a prescribed electrical condition that causes said control processor to transmit a user prompt message which, when provided by said test set, is operative to cause said control processor to operate said cross-point of said matrix switch to complete establishment of said digital subscriber line path between said CLEC and said customer premises equipment.

16. A system according to claim 15, wherein said control processor is operative to couple said prescribed identification signal associated with said CLEC to said cross-point of said test matrix switch associated with a wireline path to said wireline connection, and to decouple said cross-point from a communication path through which digital communication services are supplied by said CLEC and, in response to detecting said message that is effective to complete establishment of said digital subscriber line path between said CLEC and said customer premises equipment, to couple said cross-point to a communication path through which digital communication services are supplied by said CLEC, and to decouple said cross-point from a path through which said prescribed identification signal associated with said CLEC is provided.

17. A system according to claim 15, wherein said test set is configured to be unobtrusively coupled to said wireline connection, so as to enable said technician to listen for a prescribed audio message associated with said CLEC, and thereafter be placed in an off-hook condition, in response to said technician detecting said prescribed audio message associated with said CLEC.

18. A system according to claim 15, wherein said prescribed identification signal associated with said CLEC comprises a synthesized voice message that enables said technician to identify said CLEC.

* * * * *